May 1, 1928.
C. D. RUSSELL
CAN SEALING MACHINE
Filed Sept. 10, 1924
1,667,991
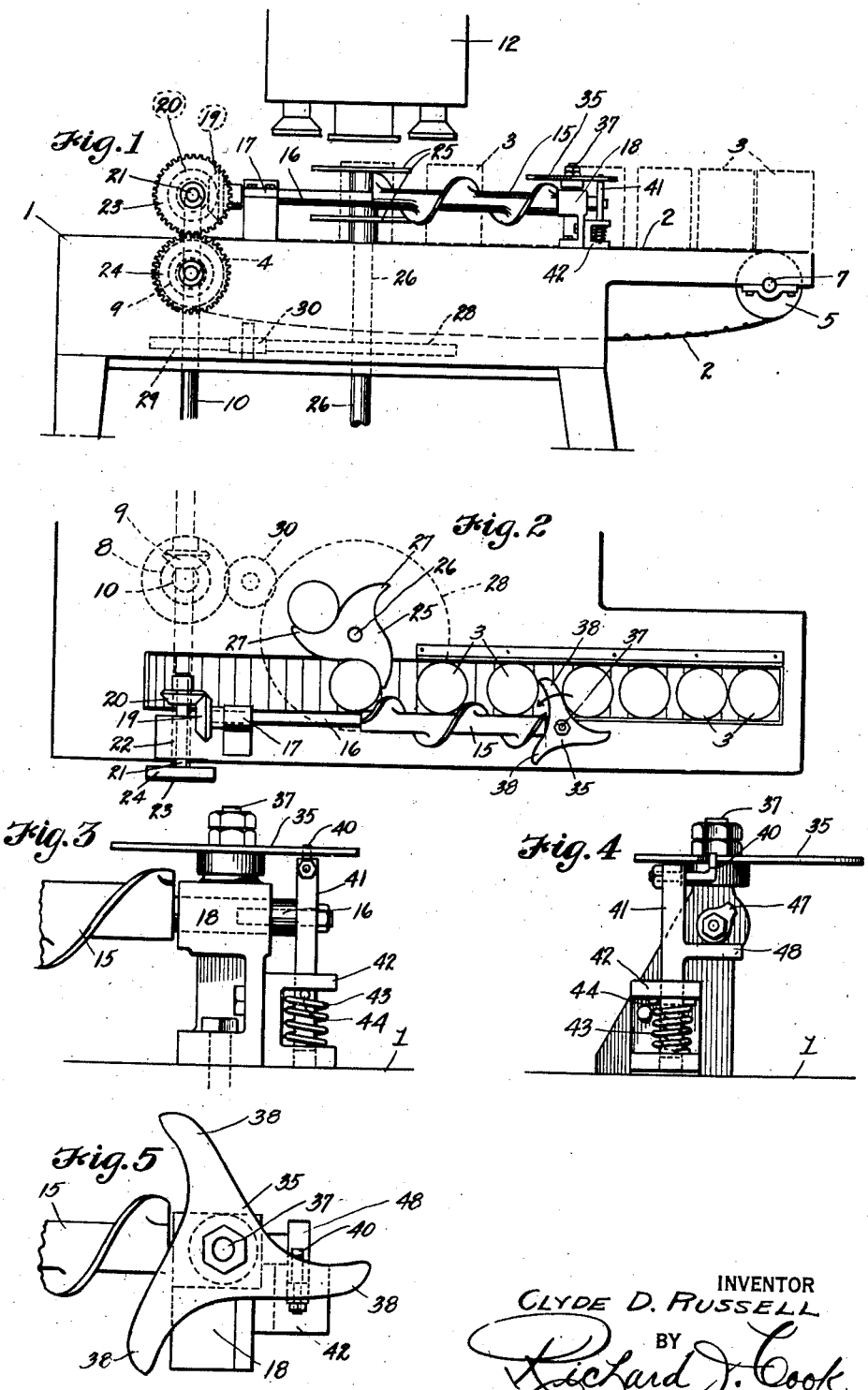
INVENTOR
CLYDE D. RUSSELL
BY
Richard J. Cook
ATTORNEY Patented May 1, 1928.

1,667,991

UNITED STATES PATENT OFFICE.

CLYDE D. RUSSELL, OF OAKLAND, CALIFORNIA, ASSIGNOR TO SEATTLE-ASTORIA IRON WORKS, OF SEATTLE, WASHINGTON.

CAN-SEALING MACHINE.

Application filed September 10, 1924. Serial No. 736,953.

This invention relates to improvements in can sealing machines and more particularly to a timing mechanism operable to control the advance of cans to the feed screw whereby they are advanced in the machine to the seamer; it being the principal object of this invention to provide means, operable in synchronism with the feed screw, which will admit the cans to the screw at such times that they will be taken into the machine thereby wihout being bent or dented. Heretofore, there has been quite a loss due to improper or irregular feeding of the cans to the screw which permitted the thread of the latter to come squarely against the can wall and the latter to be mashed or dented so that the can had to be discarded, and it is for the purpose of avoiding this that the present timing means has been provided.

Other objects of the invention reside in the various details of construction and combination of parts embodied in the invention and in their mode of operation.

In accomplishing these and other objects of the invention, I have provided the improved details of construction, the preferred forms of which are illustrated in the accompanying drawings, wherein—

Figure 1 shows in side elevation, a part of a can sealing machine equipped with mechanism in accordance with the present invention.

Figure 2 is a plan view of the same, better illustrating the location and function of the timing wheel.

Figure 3 shows an enlarged side elevation of the timing mechanism.

Figure 4 is an end view of the same showing the tripping cam.

Figure 5 is a plan view of the parts as shown in Figure 3.

Referring more in detail to the drawings—

1 designates the base, or bed plate, of a machine which may be a can seamer, or any similar type of machine and 2 designates a feed belt operating along the top of the base and on which can bodies, as designated at 3, may be delivered to the seaming mechanism. The belt 2 may be of the link type shown, or of any other suitable construction, and is carried and operated by supporting wheels 4 and 5 mounted respectively on shafts 6 and 7 held in suitable bearings provided on the base.

In the present instance the belt is moved by the wheel 4 which is driven by means of a driving connection effected through a pair of bevel gears 8 and 9 from a driven shaft 10; the latter being mounted vertically and is operatively connected by means not shown, with any suitable driving device.

Supported above the base is the seaming mechanism which I have designated only in a general way, at 12, and operating parallel with the belt 2 is a feed screw 15 whereby the cans 3 are delivered in properly spaced relation from the belt to the seamer. The supporting shaft 16 on which the screw is fixed is rotatably mounted at its ends in bearings 17 and 18 which are fixed to the base 1, and it is driven in synchronism with the seaming mechanism by a driving connection effected through bevel gears 19 and 20 with a shaft 21 supported upon the base in a bearing 22 and which is driven from the shaft 6 through gear wheels 23 and 24 fixed in mesh on these shafts.

As the cans 3 are advanced by the belt 2 they are brought into engagement with the feed screw, the purpose of which is to space them apart and deliver them at properly timed intervals to the seamer. Beneath the seamer there are feed wheels 25 fixed on the upper end of a vertical shaft 26 and which have fingers 27 for engaging and advancing the cans as they are delivered from the screw. The shaft 26 is driven in proper time with respect to the movement of the screw, by a train of gears comprising a gear 28 on the shaft 26, a gear 29 on the shaft 10 and an idler gear 30 meshing with gears 28 and 29.

In order that the cans 3 will not be advanced too quickly to the screw and thereby be damaged by the thread coming solidly in contact therewith, I have provided the timing wheel 35 which operates to hold back the cans advanced by the belt, and to release them only at such time with respect to the rotative movement of the screw that they will be carried into the screw without possibility of damage thereto.

The wheel 35 is supported horizontally to rotate on a pintle 37 fixed in the top of bearing 18, and it has three equally spaced, laterally extended fingers 38 adapted to extend into the path of the cans advanced by the belt. The wheel is prevented from rotating freely by means of a stop finger 40 that is mounted to engage with the fingers of the wheel, in the upper end of a plunger 41 slidably mounted in a bracket 42 that is fixed to the bearing 18. The plunger is yieldingly held at its upper limit of travel by means of a coiled spring 43 contained within the bracket and which bears upwardly against a pin 44 through the plunger and when the plunger is in this position, the wheel 35 cannot rotate and the cans advanced by the belt are held back. Fixed on the end of the shaft 16 is a cam 47, (see Figure 4), adapted with each revolution of the shaft to engage with a lateral projecting arm 48 on the plunger to press the plunger downwardly to thereby release the stop finger 40 from the wheel, thereby permitting the latter to be moved rotatably by the pressure of a can against one of its fingers until the next finger comes in contact with the stop 40.

This mode of operation permits the advance of one can into the feed screw with each revolution thereof, and at such time, with respect to the thread of the screw, that the cans will not be mashed or dented.

It is apparent that with this construction, the cans are admitted to the screw only at proper periods, regardless of their rate of delivery by the belt 2. The arms 38 of the wheel operate to hold back the cans and to admit them, one at a time, in accordance with the rate of rotation of the feed screw.

Having thus described my invention, what I claim as new therein and desire to secure by Letters Patent, is:

In a machine of the class described, the combination wth a feed screw having a supporting bearing at its receiving end and a conveyer operable parallel with the screw to deliver articles into position for advancement between the threads of the screw, of a timing gear mounted rotatably on said bearing having a plurality of equally spaced, radially extending arms projecting into the path of delivery of the articles, a plunger supported from the bearing perpendicular to the plane of the gear, a stop finger carried by said plunger, a spring normally retaining the plunger in position so that said stop engages an arm of the timing gear to prevent its rotation to thereby hold back the articles from contact with the screw, a projecting arm on the plunger and a cam on the screw engageable with the said arm to actuate the plunger against the pressure of the spring to release the gear for a definite rotative movement to permit the delivery of articles singly between the threads of the screw.

Signed at Oakland, Alameda County, California, this 27th day of July, 1924.

CLYDE D. RUSSELL.